(12) United States Patent
Robinette et al.

(10) Patent No.: US 8,977,457 B2
(45) Date of Patent: Mar. 10, 2015

(54) TRANSMISSION CLUTCH CONTROL USING LUMPED INERTIA MODELING

(71) Applicant: GM Global Technology Operations LLC, Detroit, MI (US)

(72) Inventors: Darrell Lee Robinette, Brighton, MI (US); Daniel N. Wehrwein, Holly, MI (US); Jeremy V. Horgan, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 50 days.

(21) Appl. No.: 13/941,605

(22) Filed: Jul. 15, 2013

(65) Prior Publication Data
US 2015/0019090 A1  Jan. 15, 2015

(51) Int. Cl.
| G06F 7/00 | (2006.01) |
| B60W 10/02 | (2006.01) |
| B60W 10/06 | (2006.01) |
| B60W 10/11 | (2012.01) |

(52) U.S. Cl.
CPC .............. B60W 10/02 (2013.01); B60W 10/06 (2013.01); B60W 10/11 (2013.01)
USPC ................. 701/68; 701/60; 701/67; 477/166; 477/180

(58) Field of Classification Search
CPC ..................... B60W 10/02; B60W 2050/0008; B60W 2510/02; B60W 2510/0208; B60W 2510/0266; B60W 2710/021
See application file for complete search history.

(56) References Cited

U.S. PATENT DOCUMENTS

| 7,985,163 | B2* | 7/2011 | Jiang .............................. 477/180 |
| 8,337,361 | B2* | 12/2012 | Fujii et al. ...................... 477/155 |
| 8,412,426 | B2* | 4/2013 | Sah .................................. 701/64 |
| 8,636,613 | B2* | 1/2014 | Teslak et al. ................... 475/125 |
| 8,801,567 | B2* | 8/2014 | Demirovic et al. ............... 477/5 |
| 8,849,489 | B2* | 9/2014 | Patel et al. ....................... 701/22 |
| 2014/0081491 | A1* | 3/2014 | Gupta et al. .................... 701/22 |

* cited by examiner

*Primary Examiner* — David D Le
(74) *Attorney, Agent, or Firm* — Quinn Law Group, PLLC

(57) ABSTRACT

A vehicle powertrain includes an engine, transmission, torque converter assembly, and controller. The controller includes recorded lumped inertia models of the powertrain and instructions for executing a clutch-to-clutch shift using these models. The models collectively reduce powertrain dynamics to two or three degrees of freedom. The controller executes a method to estimate clutch torques using the models. The models may include a first primary inertia block describing engine inertia and inertia of a torque converter pump, and a second primary inertia model describing the inertia of the turbine and transmission as reflected to the input member. The second primary inertia model includes bulk inertia models for each fixed gear state and each possible shift maneuver. The controller derives a required output torque value as a closed-loop target value using the lumped inertia models and a requested input torque, and uses the estimated clutch torque to achieve the target value.

16 Claims, 4 Drawing Sheets

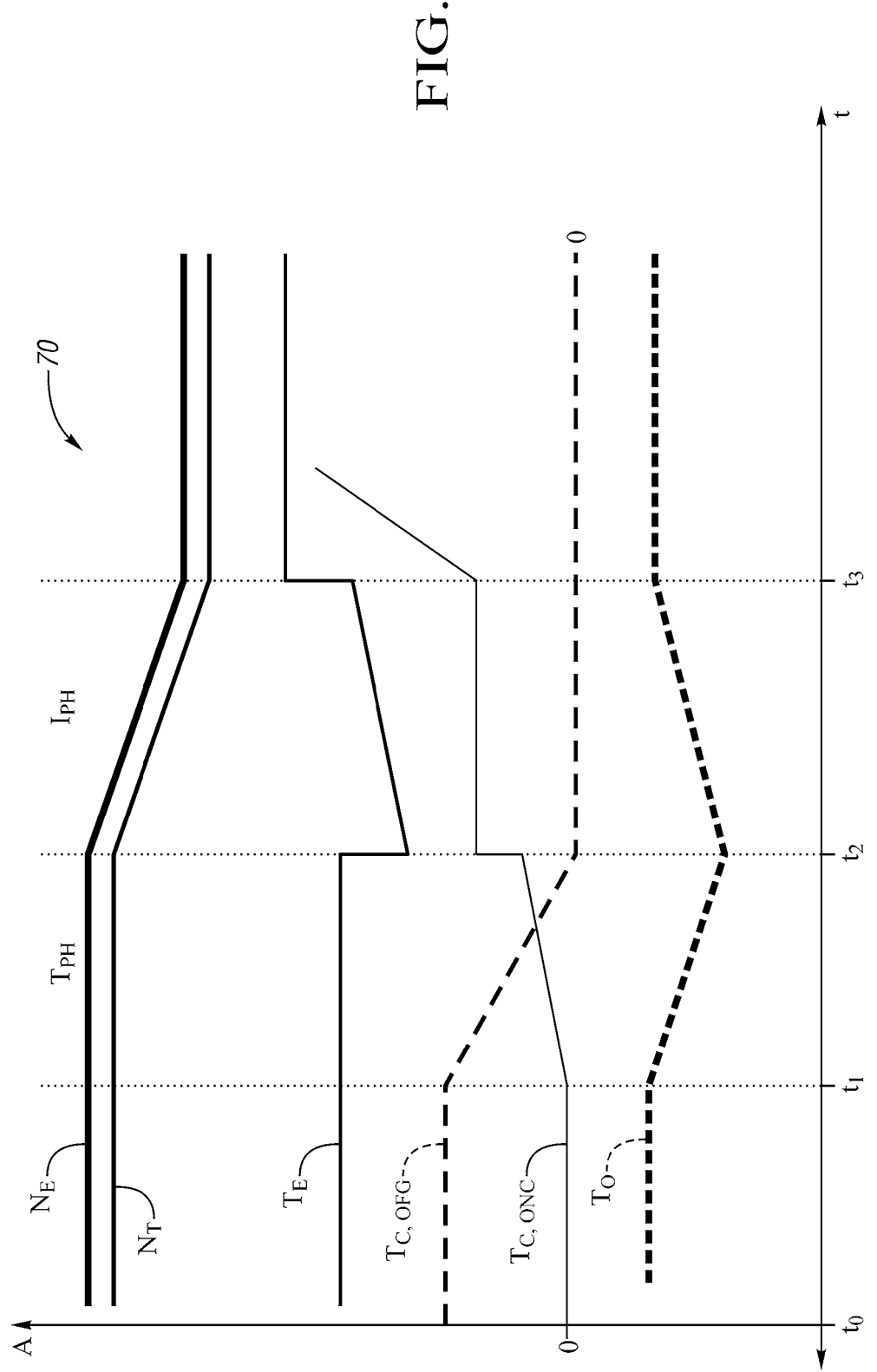

TRANSMISSION CLUTCH CONTROL USING LUMPED INERTIA MODELING

TECHNICAL FIELD

The present disclosure relates to transmission clutch control using lumped inertia modeling.

BACKGROUND

A conventional vehicle transmission includes an input member, an output member, and a gear box containing various clutches and gear sets. The input member receives input torque from an internal combustion engine and transfers it to the output member at a desired speed ratio via the clutches and gear sets. The output member ultimately powers a drive axle to propel the vehicle.

A clutch-to-clutch shift occurs in such a transmission via the release of a first clutch associated with the current speed ratio, i.e., the offgoing clutch, and coordinated engagement of a second clutch associated with a desired new speed ratio, i.e., the oncoming clutch. Closed-loop control of the release and engagement of the respective offgoing and oncoming clutches through the torque and inertia phases of a clutch-to-clutch shift helps avoid a perceptible interruption of power flow through the transmission.

SUMMARY

A vehicle powertrain is disclosed herein. The powertrain includes an internal combustion engine, an automatic transmission, a torque converter assembly, a plurality of clutches, and a controller. In a possible embodiment, the controller may include an engine control module (ECM) and a transmission control module (TCM), with the ECM receiving a requested output torque from a driver of the vehicle, typically in the form of a throttle signal. The TCM executes a clutch-to-clutch shift by estimating the required output torque using a plurality of lumped inertia models as set forth herein.

The controller includes a processor and tangible, non-transitory memory on which is recorded a plurality of lumped inertia models and instructions for executing the clutch-to-clutch shift. The lumped inertia models of the present invention collectively reduce the powerflow dynamics of the vehicle powertrain, i.e., to only two control degrees of freedom (DOF) during any fixed gear states and three DOF during a shift event. The controller estimates required offgoing and oncoming clutch torque for the clutch-to-clutch shift using the lumped inertia models, and uses the clutch torques in a closed-loop to achieve the output torque, i.e., the control target in the closed-loop control described herein.

A transmission assembly is also disclosed for the vehicle powertrain. The transmission assembly includes an input member that receives input torque from a drive shaft of the engine, an output member, a plurality of clutches operable to execute a clutch-to-clutch shift, and the controller noted above.

Additionally, a method is disclosed for executing a clutch-to-clutch shift of the transmission in the vehicle powertrain described above. The method includes recording a plurality of lumped inertia models and instructions for executing a plurality of clutch-to-clutch shifts of the transmission using the lumped inertia models, including recording lumped inertia models which collectively reduce the dynamics of the vehicle powertrain to two degrees of freedom (DOF) for all fixed gear modes and three DOF for each of the clutch-to-clutch shifts. The method also includes estimating, via a controller, a required clutch torque for each of a plurality of clutches of the transmission used in a corresponding one of the clutch-to-clutch shifts using the lumped inertia models. Execution of the corresponding clutch-to-clutch shift is commanded via the controller using the estimated required clutch torques.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a graphical time plot of changing vehicle parameters in the example power on upshift, as determined via the logic flow diagram of FIG. 4.

DETAILED DESCRIPTION

Figure 1:
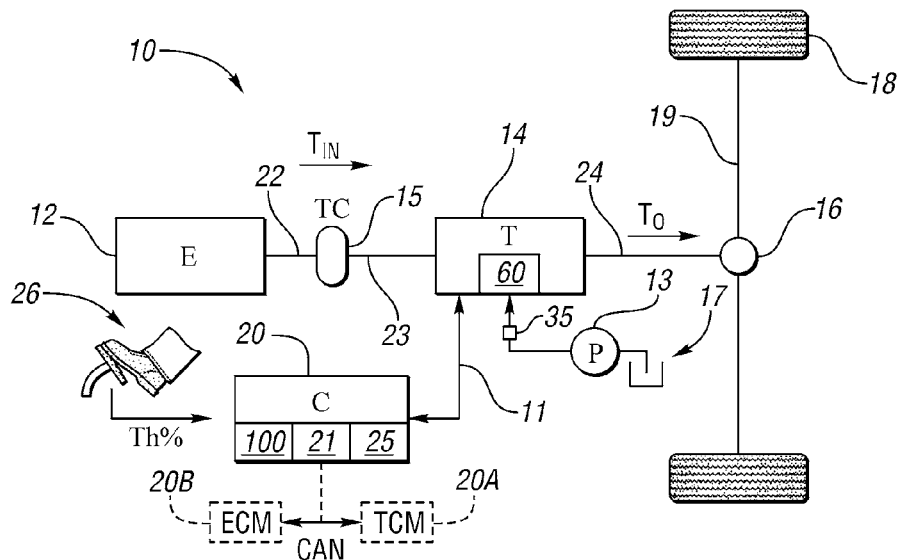
FIG. 1 is a schematic illustration of an example vehicle having a powertrain that includes an engine, a torque converter assembly, a transmission, and a controller, the latter being configured to execute a clutch-to-clutch shift using lumped inertia models as disclosed herein.

Referring to the drawings, wherein like reference numbers correspond to like or similar components throughout the several figures, an example vehicle 10 is shown schematically in FIG. 1. The vehicle 10 includes a transmission (T) 14 and a controller (C) 20. The controller 20 may include a transmission control module (TCM) 20A and an engine control module (ECM) 20B. The TCM 20A and ECM 20B may be in communication with each other via a controller area network (CAN) bus as shown. The controller 20, e.g., the ECM 20B, receives a requested output torque from a driver of the vehicle 10 in the form of a throttle level (arrow Th %) from an accelerator pedal 26. The TCM 20A is configured to execute recorded, computer-executable code 100 embodying a method for controlling a clutch-to-clutch shift of the transmission 14, specifically by using lumped inertia modeling. The lumped inertia modeling approach disclosed in detail herein with reference to FIGS. 2-5 is intended to greatly simplify the required modeling of associated clutch dynamics in the example transmission 14 of FIG. 1.

Figure 4:
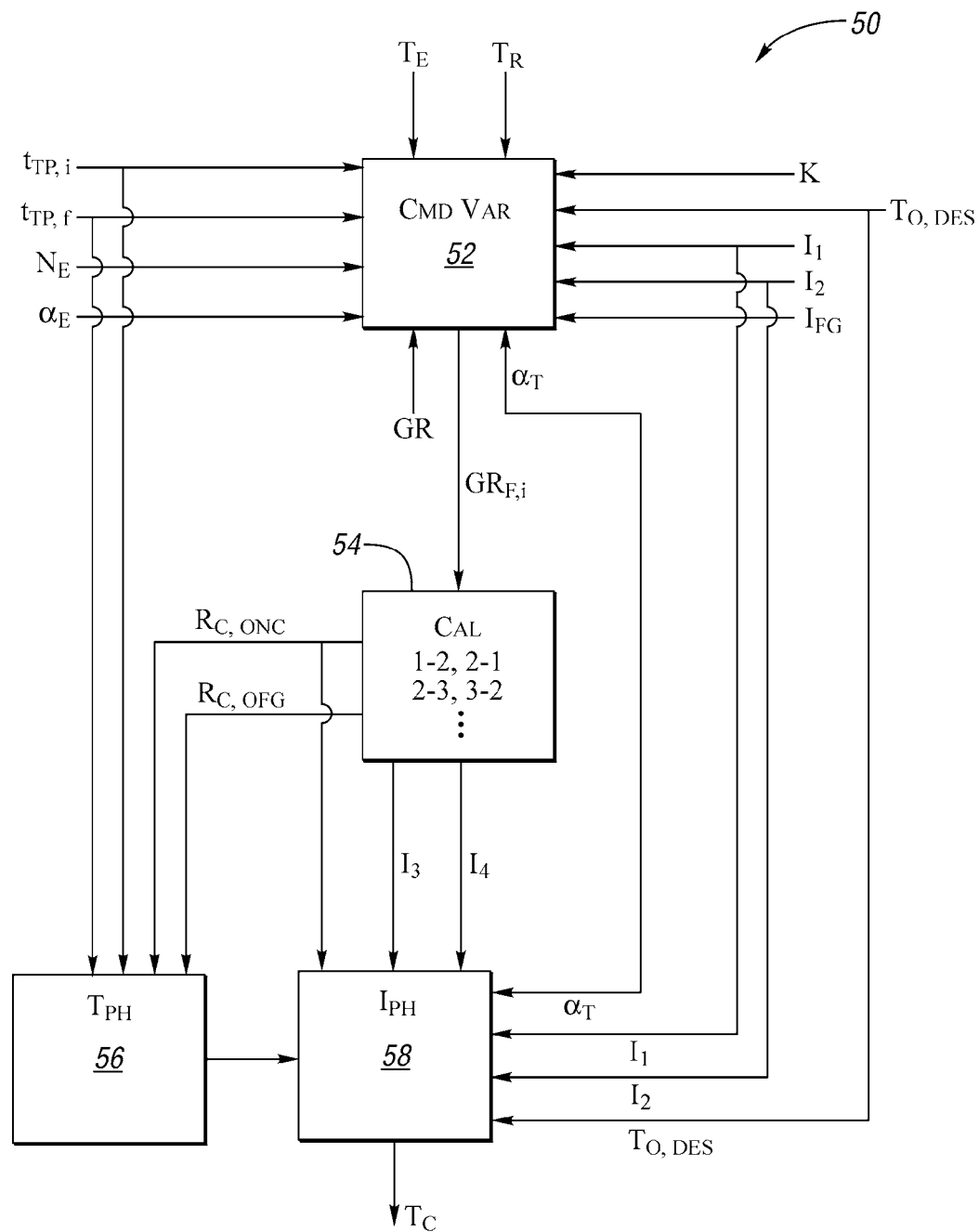
FIG. 4 is a schematic logic flow diagram for an example power on upshift of the transmission shown schematically in FIG. 1.

The present approach may be implemented in logic of the controller 20 of FIG. 1, e.g., using the logic flow 50 of FIG. 4, to automatically estimate offgoing and oncoming clutch torques during a clutch-to-clutch shift event. For illustrative consistency, a power on clutch-to-clutch upshift will be described herein. However, the disclosed control approach may also be used for other shift events such as power on downshifts, closed throttle downshifts, negative torque upshifts, positive torque downshifts during coasting, etc., without departing from the intended inventive scope.

In a conventional transmission, a full matrix of dynamic equations is determined beforehand for a given transmission design. For example, a 6-speed transmission may have approximately 700 different calibrated coefficients, each of which must be recorded as an individual calibration value. Calibration values for each possible shift combination might be recorded, for instance, in a lookup table. For such a 6-speed transmission, a 20×20 matrix might be used for the required constraints during a particular shift maneuver. By comparison, an 8-speed transmission might have a 30×30 matrix, i.e., 30 DOF, and so forth. By way of contrast, the present approach, via modeling of clutch-to-clutch shift dynamics using the specific lumped inertia modeling approach disclosed herein, and by ultimately determining closed-loop clutch torque values to command using this approach, reduces this complexity to 2 DOF in all fixed gear states and 3 DOF during shift events. As a result, the front-end calibration effort of a given transmission design may be greatly simplified.

Figure 2:
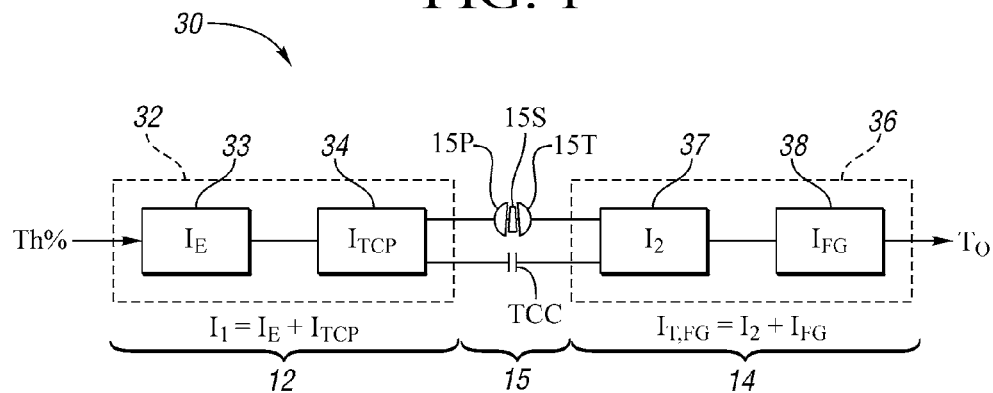
FIG. 2 is a schematic free body diagram of an example powertrain of the vehicle shown in FIG. 1 while the transmission is in a fixed gear state.
Figure 3:
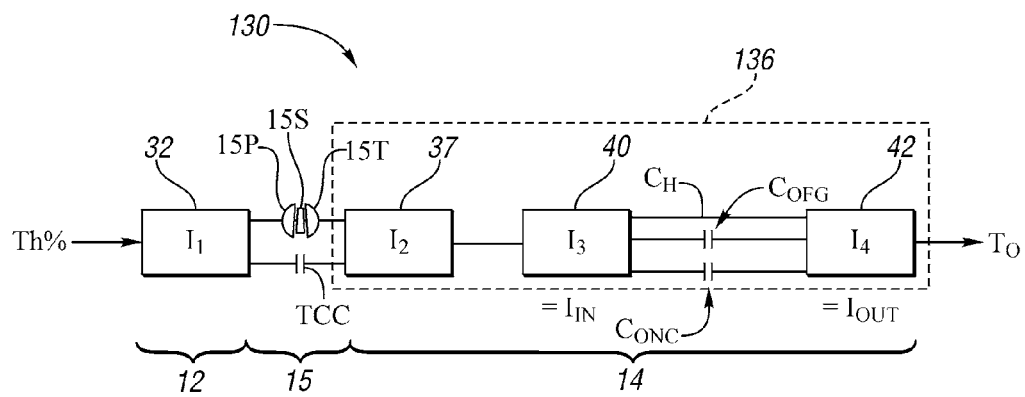
FIG. 3 is a schematic free body diagram of the same powertrain while the transmission is executing a shift event.

The example vehicle 10 shown in FIG. 1 includes an internal combustion engine (E) 12 having a drive shaft 22. The transmission 14 includes respective rotatable input and output members 23 and 24 and clutches 60, all of which may act as an oncoming or offgoing clutch for a given clutch-to-clutch shift. The input member 23 receives input torque ($T_{IN}$) from the engine 12 via a torque converter assembly (TC) 15, which may be positioned between the engine 12 and the input member 23. The torque converter assembly 15 includes an engine-driven pump (driven member), a stator, and a turbine (driven member), as is well known in the art. The rotational speed of the turbine, shown schematically as 15T in FIGS. 2 and 3, is equal to the rotational speed of the input member 23. The output member 24 delivers output torque ($T_O$) from the transmission 14 to a drive axle 19, possibly via a differential 16 as shown. The drive axle 19 ultimately powers a set of drive wheels 18 at a desired speed ratio.

Figure 1A:
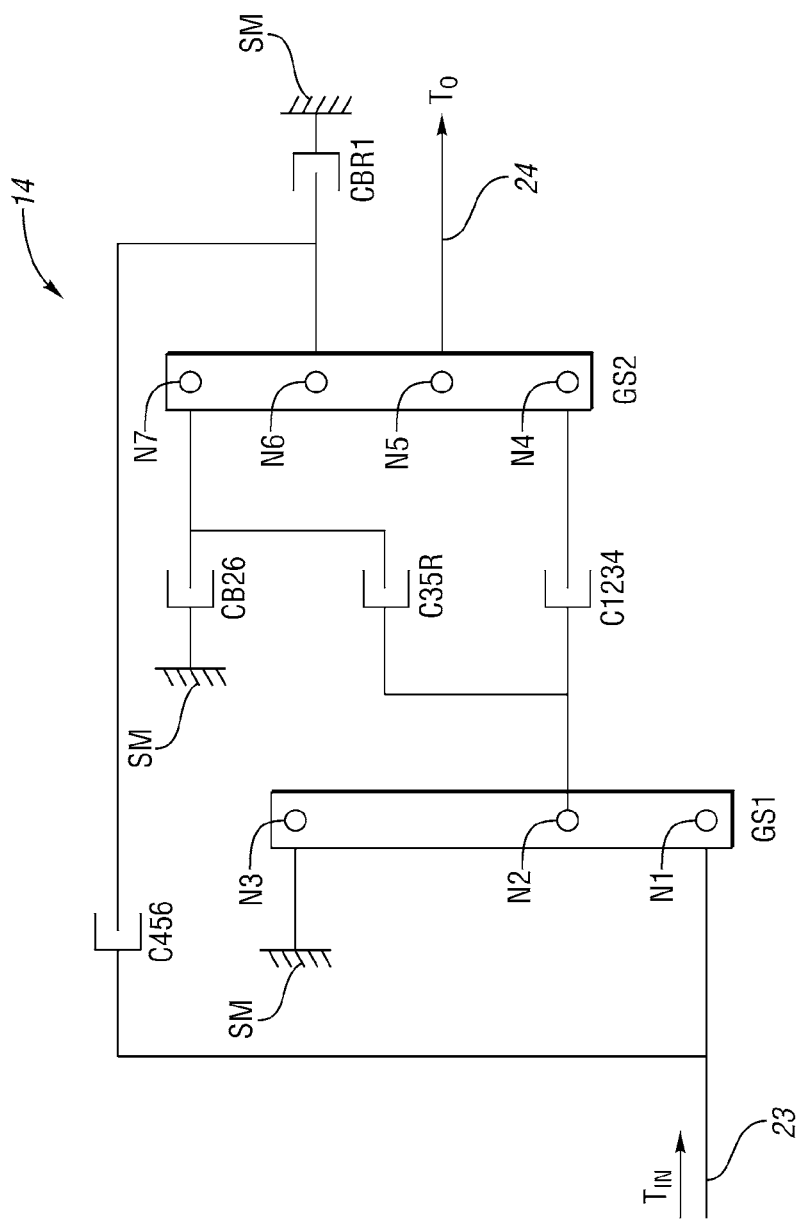
FIG. 1A is a schematic illustration of an example 6-speed transmission in lever format, which is usable as part of the powertrain shown in FIG. 1.

Referring briefly to FIG. 1A, an example 6-speed transmission is shown in schematic lever format having respective first and second gear sets GS1 and GS2, although any multi-speed transmission that executes clutch-to-clutch shifts may benefit from the present approach. In this embodiment, the input member 23 carrying the input torque ($T_{IN}$) may be connected to the first gear set GS1 having nodes N1, N2, and N3, which may be respectively embodied as a ring gear, a carrier member, and a sun gear in a possible configuration. The input member 23 may be directly connected to node N1 and to a rotating clutch C456, where "C" represents "clutch" and "456" represents the specific gears in which clutch C456 is applied or engaged, i.e., $4^{th}$, $5^{th}$, and $6^{th}$ gears. Node N2 is connected to a rotating clutch C1234 and to an input side of another rotating clutch C35R. Clutch C1234 is engaged in $1^{st}$-$4^{th}$ gears, while clutch C35R is engaged in $3^{rd}$ and $5^{th}$ gears, as well as in reverse (R). Node N3 is grounded to a stationary member SM.

The second gear set GS2 includes nodes N4, N5, N6, and N7, which may be embodied as a sun gear, a ring gear, a carrier gear, and another sun gear, respectively. Node N5 is directly connected to the output member 24, which carries output torque ($T_O$) to the drive axle 19 of FIG. 1. Node N6 is connected to a braking clutch CBR1, which is engaged in reverse and $1^{st}$ gear, and which also selectively connects node N6 to the stationary member SM. Node N4 is connected to the output side of clutch C1234. Node N7 is connected to node N2 of the first gear set N2 via clutch C35R, and to the stationary member SM via a braking clutch CB26.

In the non-limiting example embodiment of FIG. 1A, the clutches C456, C1234, C35R, and CBR1 are the clutches 60 shown in FIG. 1, and any of these devices may serve as an offgoing or oncoming clutch for a given clutch-to-clutch shift maneuver. For instance, a 1-2 power on upshift would see clutch CBR1 acting as an offgoing clutch and C1234 acting as an oncoming clutch, with the torque load of CBR1 being offloaded to clutch C1234 at the end of the upshift.

Referring again to FIG. 1, the transmission 14, regardless of its configuration, includes a pump (P) 13 which draws fluid from a sump 17 and circulates the fluid under pressure to the clutches 60, e.g., via a variable force clutch solenoid 35. As part of the overall shift control functionality of the controller 20, a driver of the vehicle 10 depresses the accelerator pedal 26 to command an amount of desired output torque via the corresponding throttle level (% Th). In response to the throttle level (% Th), the controller 20 communicates with the transmission 14 via control signals (double headed arrow 11) to execute a requested clutch-to-clutch shift with oncoming and offgoing clutch torques, which are calculated as set forth below.

The controller 20 of FIG. 1, whether a single controller or multiple controllers, e.g., the TCM 20A and ECM 20B, may include one or more microprocessors 21 and non-transitory, tangible computer-readable memory 25, e.g., magnetic or optical memory, flash memory, and the like. The controller 20 may also include sufficient transitory memory, e.g., random access memory (RAM) and electrically-erasable programmable read only memory (EEPROM), as well as a high-speed clock, analog-to-digital (A/D) circuitry, digital-to-analog (D/A) circuitry, and any required input/output (I/O) circuitry and devices, as well as signal conditioning and buffering electronics.

The controller 20 may also be configured, i.e., programmed with any required logic and equipped in hardware, for executing the logic flow 50 shown in FIG. 4. Also, while an automatic transmission is shown schematically in FIG. 1, the present lump inertia modeling approach is valid for any clutch-to-clutch shift, including a transmission having more or fewer planetary gear sets than are shown in FIG. 1A, as well as in a dual clutch transmission having countershaft gearing.

Referring to FIG. 2, a free body diagram 30 is provided for a powertrain of the vehicle 10 shown in FIG. 1. The free body diagram 30 describes the various lumped inertias of the powertrain of vehicle 10 when the transmission 14 of FIG. 1 is in a fixed gear state. Here, first and second primary inertia blocks 32 and 36 respectively model or describe the engine 12-side and transmission 14-side bulk inertias. That is, the first primary inertia block 32 describes, via an engine inertia block 33, the inertia ($I_E$) of the engine 12 as well as of the inertia of each attached accessory drive, valve train, flywheel, flex plate, and the like. Such information may be determined beforehand based on the design of the vehicle 10 and recorded in memory 25 of FIG. 1.

The first primary inertia block 32 also describes, via a torque converter pump block 34, the known inertia ($I_{TCP}$) of an impeller/pump 15P of the torque converter assembly 15 of FIG. 1, with the pump 15P, turbine 15T, stator 15S, and torque converter clutch (TCC) shown schematically in FIG. 2. The combined inertia of primary inertia block 32 is represented in FIG. 2 as $I_1$, and may be summarized as:

$$I_1 = I_E + I_{TCP}$$

The second primary inertia block 36 of FIG. 2 includes a torque converter turbine block 37 and a lumped transmission inertia block 38. The turbine block 37 describes the inertia of the turbine 15T of the torque converter assembly 15, i.e., $I_{TCT}$, which is abbreviated $I_2$ for simplicity. The transmission inertia block 38 describes the lumped inertia of the transmission 14 while in a fixed gear (FG) state, as reflected back to the input member 23 of FIG. 1. This value is abbreviated as $I_{FG}$. Thus, the total inertia of the second primary inertia block 36 may be represented as:

$$I_{T,FG} = I_2 + I_{FG}$$

In the free body diagram 30 of FIG. 2, the input to the first primary inertia block 32 is the driver-specified torque, which is requested via the throttle level (Th %) commanded via a depression of the accelerator pedal 26 shown in FIG. 1. The controller 20 of FIG. 1 then determines the required output torque ($T_O$) of the transmission 14 in response to the requested torque.

As will be appreciated by those of ordinary skill in the art of transmission modeling, the "in gear" lumped inertias may be determined by locking a transmission model, e.g., AMESim, MATLAB, etc., into a fixed gear state and then accelerating the modeled system at a fixed rate via the transmission input member 23. The output member 24 of FIG. 1 is thus left as a free constraint. The lumped inertias can then be calculated by taking the torque(s) required to accelerate the modeled system at the transmission input member 23 and then dividing this value by the acceleration rate ($\alpha$) of the transmission input member 23, i.e.:

$$I_{FG} = \frac{T_{TS}}{\alpha}$$

where $T_{TS}$ is the torque acting on the input member 23, and thus on the turbine 15T, at this fixed acceleration rate ($\alpha$). This same procedure may be repeated for all possible fixed gear states of the transmission 14, or permutations of fixed gear pre-selection in the case of a dual-clutch transmission, to collect the values of $I_{FG}$ for each fixed gear ratio.

Referring to FIG. 3, another free body diagram 130 is provided for the powertrain of the vehicle 10 shown in FIG. 1. The free body diagram 130 describes the inertias of the powertrain when the transmission 14 of FIG. 1 is actively executing a clutch-to-clutch shift event, during which the gear shift dynamics change some of the transmission inertias that are depicted in FIG. 2. Here, the first primary inertia block 32 with inertia $I_1$ is unchanged, i.e., the inertia of the engine 12 and its attached components is unaffected by the gear state of the transmission 14. However, the transmission 14-side inertias will change due to the dynamics of the shift, in a manner that varies with the design of the transmission 14 and the particular shift maneuver being executed. This is reflected in the second primary inertia block 136.

As in FIG. 2, the second primary inertia block 136 includes the torque converter turbine block 37, with the bulk inertia $I_2$ again being that of the turbine 15T. Inertia block 40 describes the lumped input inertia transmitted into the transmission 14. This value is abbreviated as $I_{IN}$, or $I_3$ for simplicity. The holding clutch ($C_H$), the offgoing clutch ($C_{OFG}$), and the oncoming clutch ($C_{ONC}$) are also shown schematically in FIG. 3, with the holding clutch, being fully engaged at all times in a given shift maneuver, represented as a solid line. When the transmission 14 is a DCT, the holding clutch ($C_H$) is replaced with a suitable torque transfer mechanism such as a synchronizer to the same effect.

The $I_3$ term is the portion of the transmission 14 inertia upstream of the shifting clutches, as reflected back to the transmission input member 23 of FIG. 1. Inertia block 42 describes the lumped transmission output inertia, $I_{OUT}$, or $I_4$ for simplicity. This term is the transmission inertia downstream of any shifting clutch, again as reflected back to the transmission input member 23. Even though the turbine 15T and the input member 23 are rigidly coupled, in the present approach these values are represented separately, as the design of the torque converter 15 may change over the life of the transmission 14.

Therefore, in the free body diagram 130 of FIG. 3, there are now four lumped inertias: $I_1$ (the inertia of the engine 12 and torque converter pump 15T), $I_2$ (the inertia of the torque converter turbine 15T), $I_3$ (the upstream inertia as reflected to the input member 23), and $I_4$ (the downstream inertia as reflected to the input member 23). Bulk inertias $I_1$ and $I_2$ can be determined offline beforehand and recorded in memory 25 of FIG. 1, as noted elsewhere above.

The upstream and downstream inertias $I_3$ and $I_4$ may be determined thereafter as follows:

$$I_3 = \frac{T_{IN}}{\alpha_T} \quad I_4 = \frac{T_O}{\alpha_T}$$

As with the free body diagram 30 of FIG. 2, the input to the first primary inertia block 32 of FIG. 3 remains the driver-specified torque as requested by depressing the accelerator pedal 26 shown in FIG. 1, while the controller 20 still determines the required output speed of the transmission 14 in response to this requested torque. Optionally, the bulk inertias $I_3$ and $I_4$ can be known beforehand from modeling techniques determined external to the controller 20 of FIG. 1 and recorded in memory 25.

Using transmission modeling techniques as noted above, determining lumped inertias during a shift event entails forcing the transmission 14 into a specific shift maneuver with full offgoing clutch torque capacity during the torque phase of the shift and with no oncoming clutch capacity during the inertia phase. The holding clutches during the specified clutch-to-clutch shift maneuver remain at full capacity during both shift phases to fully constrain the gearbox of the transmission 14. The specified input and output speed constraints result in torques at the input and output members 23 and 24, respectively, required to maintain the desired shift profile, i.e., a desired turbine acceleration rate ($\alpha_T$). Dividing the input and output torques by this turbine acceleration rate ($\alpha_T$) yields lumped inertias corresponding to a specific shift as reflected back to the acceleration of the transmission input member 23.
Implementation During a clutch-to-clutch shift event, the equation set noted above may be reduced to just two linear equations, which can be solved simultaneously with the required constraint inputs. For a given inertia phase of a shift, the controlling clutch torque ($T_C$) may be rewritten as follows:

$$T_C = T_{IN} \cdot R_C - ((I_2 + I_3)\alpha_T) \cdot R_C$$

where $R_C$ is the known clutch lever ratio, i.e., the torque ratio with respect to the input member 23. The output torque, $T_O$, may be represented as:

$$T_O = T_{IN} \cdot GR - ((I_2 + I_3)\alpha_T) \cdot GR + I_4 \alpha_T$$

where GR is the known gear ratio, whether initial or final depending on the shift. All other values are defined elsewhere above.

Using these equations, the torque phase of the shift simply becomes a linear ramp dependent on net input torque, as is best shown in FIG. 5. Net input torque ($T_{IN}$) is then a function of the launch device, e.g., the engine 12, and the control state of the torque converter clutch (TCC) shown in FIGS. 2 and 3, i.e.:

$$T_{IN} = \left( (T_E - I_1\alpha_E) - \left(\frac{N_E}{K}\right)^2 \right) + TR\left(\frac{N_E}{K}\right)^2$$

where $T_E$, $\alpha_E$, and $N_E$ are the respective torque, acceleration rate, and rotational speed of the engine 12, and K is the K-factor of the torque converter assembly 15 of FIG. 1, i.e., an engineering term describing the rotational speed of one member of the torque converter assembly 15 divided by the square root of the torque acting on the same member. TR is the torque ratio of the torque converter assembly 15.

Referring to FIG. 4 in conjunction with the set of vehicle traces 70 of FIG. 5, an example logic flow diagram 50 is depicted in FIG. 4 for the present bulk inertia modeling and clutch control approach. FIG. 5 shows traces for engine speed ($N_E$), turbine speed ($N_T$), engine torque ($T_E$), offgoing clutch torque ($T_{C,OFG}$), oncoming clutch torque ($T_{C,ONC}$), and output torque ($T_O$) for the torque phase ($T_{PH}$) and the inertia phase ($I_{PH}$) of a clutch-to-clutch shift. Logic blocks 52, 54, 56, and 58 of FIG. 4 schematically represent the required logic steps occurring within the hardware of the controller 20, e.g., within the ECM 20B and the TCM 20A depending on the step.

Beginning with logic block 52, this represents a command variable (CMD VAR) logic level in which various vehicle control parameters are received and/or calculated as a step preparatory to shift control. Thus, via execution of associated code 100 which achieves the flow of FIG. 4, a first step is the receipt or determination of such parameters. The values include measured or calibrated values available from the TCM 20A of FIG. 1, including desired initial and final torque phase times $t_{TP,i}$ and $t_{TP,f}$, respectively, the torque converter K-factor (K), a desired output torque ($T_{O,\ DES}$), the torque ratio (TR) of the torque converter assembly 15, turbine speed ($N_T$), turbine acceleration ($\alpha_T$), and the present gear ratio (GR).

Additional values determined at the level of logic block 52 include the predetermined or calculated inertia values $I_1$, $I_2$, and $I_{FG}$ explained above. From the ECM 20B of FIG. 1, the logic block 52 receives information describing the performance of the engine 12, including its rotational speed ($N_E$), acceleration rate ($\alpha_E$), and estimated engine torque ($T_E$). From this information, the logic block 52 outputs or passes through information to logic block 54 (CAL) and logic blocks 56 ($T_{PH}$) and 58 ($I_{PH}$), the latter two blocks describing values used to control the respective torque phase and inertia phase of the power on upshift.

Logic block 54 (CAL) receives, as another step, the commanded gear ratio ($GR_{f,i}$) from logic block 52 as shown. Stored in memory 25 of the controller 20 of FIG. 1 are lookup tables capturing, for each possible shift event, the clutch lever ratios for the offgoing and oncoming clutches, i.e., $R_{C,OFG}$ and $R_{C,ONC}$, respectively, in the equations set forth above. Also recorded in lookup tables are the values of inertia values $I_3$ and $I_4$, again determined beforehand for each possible shift event, e.g., a 1-2 power upshift/2-1 power downshift, a 2-3 power upshift/3-2 power downshift, etc. Inertia values $I_1$ and $I_2$ are fixed, and thus are also available to the logic block 54 as inputs. Logic block 54 thus extracts and outputs the inertia values $I_3$ and $I_4$, as well as the clutch lever ratios $R_{C,OFG}$ and $R_{C,ONC}$.

Torque phase block 56 receives the clutch lever ratios from memory 25, as well as the desired torque phase times noted above, and the processor 21 determines the required clutch torques as follows:

$T_{C,OFG}|_{tTP,i} = T_{IN} \cdot R_{C,OFG}$, which is the value of $T_{C,\ OFG}$ shown at $t_0$-$t_1$ in FIG. 5

$T_{C,OFG}|_{tTP,f} = 0$, i.e., the value of $T_{C,\ OFG}$ at $t_2$ in FIG. 5

$T_{C,ONC}|_{tTP,i} = 0$, i.e., the value of $T_{C,\ ONC}$ at $t_1$ in FIG. 5.

$T_{C,ONC}|_{tTP,f} = T_{IN} \cdot R_{C,ONC}$, which is the value of $T_{C,\ ONC}$ shown at $t_1$-$t_2$ in FIG. 5.

Inertia phase block 58 determines the required clutch torques for the inertia phase of the shift as follows:

$T_C = T_{IN} \cdot R_{C,ONC} - ((I_2 + I_3)\alpha_T) \cdot R_{C,ONC}$, i.e., the value shown between t2 and t3 of FIG. 5, and where, as noted above:

$T_O = T_{IN} \cdot GR_f - ((I_2 + I_3)\alpha_T) \cdot GR_f + I_4\alpha_T$, i.e., the value shown between $t_2$ and $t_3$ of FIG. 5, with $T_{IN}$ defined as:

$$T_{IN} = \left( (T_E - I_1\alpha_E) - \left(\frac{N_E}{K}\right)^2 \right) + TR\left(\frac{N_E}{K}\right)^2$$

The required clutch torque value $T_C$ in the inertia phase is sent to the TCM 20A of FIG. 1 and transformed into a corresponding clutch pressure request, which is ultimately transmitted to a transmission valve body (not shown) containing the valve 35 of FIG. 1 to thereby actuate the shifting clutch, i.e., the oncoming clutch used in the particular shift event. The transmission output torque $T_O$ that is noted above thus acts as the target for the shift event, and the clutch torque $T_C$ is the particular control value used in a closed-loop to achieve this target in the desired calibration time for this shift.

The approach detailed above thus provides a simplified method for modeling planetary automatic transmission dynamics using lumped inertias, which reduces to only two degrees of freedom for any shift event. This is intended to provide a greatly reduced number of nodal inertias and inputs relative to the conventional art. An intuitive gearbox model results that may facilitate debugging during the calibration process while freeing processing power and memory storage requirements. The present approach may also facilitate clutch-to-clutch shifts with a greater illustration of the parameters having the most impactful effect on shift dynamics.

While the best modes for carrying out the invention have been described in detail, those familiar with the art to which this invention relates will recognize various alternative designs and embodiments for practicing the invention within the scope of the appended claims.

The invention claimed is:

1. A vehicle powertrain comprising:
  an internal combustion engine having a drive shaft carrying an input torque;
  a transmission having an input member that receives the input torque, an output member, and a plurality of clutches operable to execute a plurality of clutch-to-clutch shifts;
  a torque converter assembly having a pump that is connected to the drive shaft and a turbine that is connected to the input member; and
  a controller having a processor and tangible, non-transitory memory on which is recorded a plurality of lumped inertia models and instructions for executing the clutch-to-clutch shifts using the lumped inertia models, wherein the lumped inertia models collectively reduce the dynamics of the vehicle powertrain to two degrees of freedom (DOF) for all fixed gear modes and three DOF for each of the clutch-to-clutch shifts, and wherein the controller is programmed to:
    estimate a required clutch torque for each of the clutches used in a corresponding one of the clutch-to-clutch shifts using the lumped inertia models, and command execution of the corresponding clutch-to-clutch shift using the required clutch torques.

2. The powertrain of claim 1, wherein the lumped inertia models include a first primary inertia block describing the inertia of the engine and of the pump, and a second primary inertia model describing the inertia of the turbine and of the transmission as reflected to the input member.

3. The powertrain of claim 2, wherein the second primary inertia model includes bulk inertia models of the transmission for each of the fixed gear modes and for each of the clutch-to-clutch shifts.

4. The powertrain of claim 1, wherein the controller is programmed to derive a required output torque value of the transmission as a target value using the lumped inertia models and a requested input torque, and uses the estimated required clutch torques in a closed-loop to achieve the target value.

5. The powertrain of claim 1, wherein the controller includes an engine control module configured to receive the requested input torque and a transmission control module configured to estimate required oncoming and offgoing clutch torques, as the required clutch torques, for the clutch-to-clutch shift as a function of the requested input torque.

6. A transmission assembly for a vehicle powertrain having an engine, the transmission assembly comprising:
   an input member that receives input torque from a drive shaft of the engine;
   an output member;
   a plurality of clutches operable to execute a clutch-to-clutch shift; and
   a controller that includes a processor and tangible, non-transitory memory on which is recorded a plurality of lumped inertia models and instructions for executing the clutch-to-clutch shift using the lumped inertia models, wherein the lumped inertia models collectively reduce the dynamics of the vehicle powertrain to two degrees of freedom (DOF) for all fixed gear modes and three DOF for all clutch-to-clutch shifts of the transmission, and wherein the controller is programmed to:
      estimate required clutch torques for each clutch-to-clutch shift of the transmission using the lumped inertia models; and
      execute a designed one of the clutch-to-clutch shifts using the estimated clutch torques for the designated one shift.

7. The transmission assembly of claim 6, wherein the vehicle powertrain includes a torque converter assembly having a pump that is connected to the drive shaft and a turbine that is connected to the input member, wherein the lumped inertia models include a first primary inertia block describing the inertia of the engine and of the pump, and a second primary inertia model describing the inertia of the turbine and of the transmission as reflected to the input member.

8. The transmission assembly of claim 7, wherein the second primary inertia model includes a lookup table containing bulk inertias of the transmission for each of the fixed gear states and for each of the possible clutch-to-clutch shifts.

9. The transmission assembly of claim 6, wherein the controller is programmed to derive a required output torque value as a target value using the lumped inertia models and a requested input torque, and to use the estimated clutch torque in a closed-loop to achieve the target value.

10. The transmission assembly of claim 6, wherein the controller includes an engine control module configured to receive the requested input torque and a transmission control module configured to estimate the oncoming and offgoing clutch torques, as the required clutch torques, as a function of the requested input torque.

11. A method for executing a clutch-to-clutch shift of a transmission of a vehicle powertrain having an internal combustion engine, a transmission, and a torque converter assembly, the method comprising:
   recording a plurality of lumped inertia models and instructions for executing a plurality of clutch-to-clutch shifts of the transmission using the lumped inertia models, including recording lumped inertia models which collectively reduce the dynamics of the vehicle powertrain to two degrees of freedom (DOF) for all fixed gear modes and three DOF for each of the clutch-to-clutch shifts;
   estimating, via a controller, a required clutch torque for each of a plurality of clutches of the transmission used in a corresponding one of the clutch-to-clutch shifts using the lumped inertia models; and
   commanding execution of the corresponding clutch-to-clutch shift via the controller using the estimated required clutch torque for each of the plurality of clutches used in the corresponding one shift.

12. The method of claim 11, wherein estimating the required clutch torques includes estimating an oncoming clutch torque and an offgoing clutch torque.

13. The method of claim 11, wherein recording a plurality of lumped inertia models includes recording a first primary inertia block describing the inertia of the engine and of the pump, and recording a second primary inertia model describing the inertia of the turbine and of the transmission as reflected to the input member.

14. The method of claim 13, wherein recording the second primary inertia model includes recording bulk inertia models of the transmission for each of the fixed gear modes and for each of the clutch-to-clutch shifts.

15. The method of claim 11, further comprising:
   deriving, via the controller, a required output torque value of the transmission as a target value using the lumped inertia models and a requested input torque; and
   using the estimated required clutch torques in a closed-loop to achieve the target value.

16. The method of claim 11, wherein the controller includes an engine control module and a transmission control model, the method further comprising:
   receiving the requested input torque via the ECM; and
   estimating the required oncoming and offgoing clutch torques via the TCM, as the required clutch torques, for the clutch-to-clutch shift as a function of the requested input torque.

* * * * *